(12) United States Patent
Chen et al.

(10) Patent No.: US 10,335,735 B2
(45) Date of Patent: Jul. 2, 2019

(54) METHOD OF CAPTURING CARBON DIOXIDE

(71) Applicant: NATIONAL CHENG KUNG UNIVERSITY, Tainan (TW)

(72) Inventors: Chih-Yung Chen, Tainan (TW); Chen-Chien Wang, Tainan (TW); Jian-Sheng Shen, Tainan (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 15/716,738

(22) Filed: Sep. 27, 2017

(65) Prior Publication Data

US 2018/0154307 A1  Jun. 7, 2018

(30) Foreign Application Priority Data

Dec. 2, 2016  (TW) .............................. 105139973 A

(51) Int. Cl.

| | |
|---|---|
| *B01D 53/62* | (2006.01) |
| *B01D 53/14* | (2006.01) |
| *B01D 53/73* | (2006.01) |
| *B01D 53/78* | (2006.01) |
| *B01D 53/96* | (2006.01) |
| *C01B 32/50* | (2017.01) |

(52) U.S. Cl.
CPC ......... *B01D 53/62* (2013.01); *B01D 53/1475* (2013.01); *B01D 53/1493* (2013.01); *C01B 32/50* (2017.08); *B01D 2251/306* (2013.01); *B01D 2252/10* (2013.01); *B01D 2252/2041* (2013.01); *B01D 2252/20426* (2013.01); *B01D 2257/504* (2013.01); *Y02C 10/04* (2013.01); *Y02C 10/06* (2013.01); *Y02P 20/152* (2015.11)

(58) Field of Classification Search
None
See application file for complete search history.

(56) References Cited

U.S. PATENT DOCUMENTS

| | | | | |
|---|---|---|---|---|
| 3,896,212 A | * | 7/1975 | Eickmeyer | ......... B01D 53/1406 423/223 |
| 4,789,530 A | * | 12/1988 | Johnson | ............ B01D 53/1462 423/226 |
| 2011/0309295 A1 | * | 12/2011 | Joh | .................... B01D 53/1475 252/184 |
| 2018/0200666 A1 | * | 7/2018 | Baxter | ............... B01D 53/1475 |

FOREIGN PATENT DOCUMENTS

WO   WO2015/092427   *   6/2015   ............. B01D 53/14

* cited by examiner

*Primary Examiner* — Daniel Berns

(74) *Attorney, Agent, or Firm* — Michael Best & Friedrich LLP

(57) ABSTRACT

A method of capturing carbon dioxide from a source thereof includes contacting a carbon dioxide-containing source with a reactive solution that includes an absorption agent so that carbon dioxide in the carbon dioxide-containing source is absorbed by the absorption agent. The absorption agent may be potassium phosphate, potassium ethylenediamine-tetraacetate (potassium EDTA), a potassium monocarboxylate having a total of 12 or less carbon atoms, or combinations thereof.

9 Claims, No Drawings

METHOD OF CAPTURING CARBON DIOXIDE

CROSS-REFERENCE TO RELATED APPLICATION

This application claims priority of Taiwanese Patent Application No. 105139973, filed on Dec. 2, 2016.

FIELD

The disclosure relates to a method of capturing carbon dioxide, and more particularly to a method of capturing carbon dioxide using specific potassium salts.

BACKGROUND

CN 103301805 A discloses a carbon dioxide adsorbent, which is prepared by mixing a molecular sieve with a solution containing two or three salts of alkaline cations (i.e., sodium ions, potassium ions and calcium ions), and subsequently by washing and drying the sieve. The suitable salt of sodium ions may be sodium chloride, sodium nitrate, sodium sulfate, sodium hydroxide, sodium carbonate, sodium bicarbonate, sodium acetate or sodium phosphate. The suitable salt of potassium ions may be potassium chloride, potassium nitrate, potassium sulfate, potassium hydroxide, potassium carbonate, potassium bicarbonate, potassium acetate or potassium phosphate. The suitable salt of calcium ions may be calcium chloride or calcium nitrate.

However, during the preparation of such conventional carbon dioxide adsorbent, it is time-consuming to deliver the alkaline cations into pores of the molecular sieve. Moreover, in use, it takes a long time for the carbon dioxide gas to diffuse into the molecular sieve and react with the aforesaid alkaline cations, and a solid product resulting from the reaction of the alkaline cations with carbon dioxide precipitates and blocks the sieve, rendering the same hardly reusable.

Therefore, the applicants have endeavored to develop a novel and convenient method to effectively collect carbon dioxide.

SUMMARY

Therefore, an object of the disclosure is to provide a method of capturing carbon dioxide from a source thereof, which can alleviate at least one of the drawbacks of the prior art.

The capturing method includes contacting a carbon dioxide-containing source with a reactive solution that includes an absorption agent so that carbon dioxide in the carbon dioxide-containing source is absorbed by the absorption agent. The absorption agent is selected from potassium phosphate, potassium ethylenediamine-tetraacetate (potassium EDTA), a potassium monocarboxylate having a total of 12 or less carbon atoms, or combinations thereof.

DETAILED DESCRIPTION

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which this disclosure belongs. One skilled in the art will recognize many methods and materials similar or equivalent to those described herein, which could be used in the practice of this disclosure. Indeed, this disclosure is in no way limited to the methods and materials described.

As used herein, the terms "absorb" and "absorption" are used to broadly include "adsorb", "attract", "capture", and "trap", and refer to dissolution of a gas in a liquid or conversion of a gas to a soluble or insoluble salt in a liquid.

As used herein, the terms "desorb" and "desorption" refer to conversion of a gas dissolved in a liquid to a gas no longer dissolved in the same liquid.

According to this disclosure, a method of capturing carbon dioxide from a source thereof includes:

contacting a carbon dioxide-containing source with a reactive solution that includes an absorption agent so that carbon dioxide in the carbon dioxide-containing source is absorbed by the absorption agent.

According to the disclosure, the absorption agent may be potassium phosphate (such as dipotassium phosphate and tripotassium phosphate), potassium ethylenediamine-tetraacetate (potassium EDTA), a potassium monocarboxylate having a total of 12 or less carbon atoms, or combinations thereof.

In certain embodiments, the absorption agent may be potassium acetate, potassium propionate, potassium butyrate, tetrapotassium ethylenediamine-tetraacetate, or combinations thereof.

In certain embodiments, the reactive solution to be in contact with the carbon dioxide-containing source further includes a solvent for dissolving the absorption agent. There is no particular limitation on the solvent of the disclosure as long as it can dissolve the absorption agent and does not interfere with the absorption and desorption of carbon dioxide. Examples of the solvent suitable for the method of the disclosure may include, but are not limited to, water, dimethyl sulfoxide, dimethyl formamide and combinations thereof. In certain embodiments, the solvent is water.

The concentration of the reactive solution may vary with actual need. For example, in some embodiments, the molality of the absorption agent in the reactive solution ranges from 2 m to 20 m.

In certain embodiments, the step of contacting the carbon dioxide-containing source with the reactive solution is conducted under 1 atm and a temperature ranging from 20° C. to 50° C.

According to the disclosure, the method may further include desorbing the absorbed carbon dioxide.

In certain embodiments, the absorbed carbon dioxide is desorbed by heating the reactive solution that contains the carbon dioxide absorbed by the absorption agent. There is no particular limitation on the heating conditions required. In an exemplary embodiment, the heating step is performed at a temperature ranging from 70° C. to 100° C.

In certain embodiments, the absorbed carbon dioxide is desorbed by addition of water into the reactive solution that contains the carbon dioxide absorbed by the absorption agent, particularly in the case that the potassium monocarboxylate having a total of 12 or less carbon atoms serves as an absorbing agent.

In certain embodiments, the amount of water added into the reactive solution to desorb the absorbed carbon dioxide is 30% to 50% of the weight of the reactive solution.

According to the disclosure, the method may further include collecting the desorbed carbon dioxide.

The step of collecting the desorbed carbon dioxide may be performed by a conventional process. In certain embodiments, the desorbed carbon dioxide may be collected using a drainage process.

The disclosure will be further described by way of the following examples. However, it should be understood that the following examples are solely intended for the purpose of illustration and should not be construed as limiting the disclosure in practice.

EXAMPLES

Example 1

Methods for Capturing Carbon Dioxide
<Experimental Method 1 (E1)>

39.26 g of potassium acetate serving as an absorption agent (0.4 mole, pKa=4.76) was dissolved in 20 g of water so as to obtain a reactive solution (pH 10.41, molality: 20). The reactive solution was aerated and reacted with 50 mL of $CO_2$ for 80 min under 1 atm and 29° C. so as to obtain a product which contained $CO_2$ captured by potassium acetate. The product was analyzed by thermogravimetric analysis-Fourier transform infrared spectroscopy (TGA-FTIR, which was performed using TGAQ50, Varian 2000 FTIR, and Varian TGA/IR INTERFACE respectively as a thermogravimetric analyzer, a FTIR spectrometer, and a receiver) at the absorption peak of 2400 cm-1 to determine whether $CO_2$ was captured by the absorption agent. The absorbed $CO_2$ amount in the product was determined by a gravimetric method, so as to calculate the absorbed $CO_2$ amount per mole of the absorption agent.

Thereafter, 25 g of water having a temperature of 30° C. was added into the product under 1 atm and 29° C. to desorb the absorbed $CO_2$, followed by collecting the desorbed $CO_2$ using a drainage process until no gas bubbles were generated. In this example, the time period from initiation to termination of gas bubble formation (i.e. the desorbing time) was 10 min. The collected $CO_2$ was confirmed and analyzed by TGA-FTIR and lime water.

<Experimental Methods 2-7 (E2-E7)>

E2-E7 were similar in procedure to E1. The differences resided in the reactive solution used therein and the conditions for desorbing the absorbed $CO_2$.

To be specific, in E2-E4, the respective molality of the absorption agent in the reactive solution was 15 m, 10 m or 5 m; the respective amount of water added to desorb the absorbed carbon dioxide was respectively 20 g, 15 g or 10 g; and the respective desorbing time was 25 sec, 15 sec or 5 sec.

In E5-E7, the respective absorption agent was potassium propionate (pKa=4.88), potassium butyrate (pKa=4.82) or dipotassium phosphate (pKa=12.4); and the respective molality of the absorption agent in the reactive solution was 16 m, 16 m or 8 m. In addition, the respective amount of water added to desorb the absorbed carbon dioxide was 15 g, 15 g or 10 g, and the respective desorbing time was 25 sec, 30 sec or 32 sec.

<Experimental Methods 8-9 (E8-E9)>

E8 was similar in procedure to E1, except that the absorbed $CO_2$ was desorbed by heating the product in a microwave (TATUNG TMO-17 MB) under a heating power of 700 W for 3 sec. In E8, the desorbed $CO_2$ was not collected.

E9 was similar in procedure to E8, except that the absorption agent was tetrapotassium ethylenediamine-tetraacetate (tetrapotassium EDTA, pKa=1.782) and the molality of the absorption agent in the reactive solution was 2.65 m.

<Comparative Methods 1-3 (C1-C3)>

In C1-03, calcium acetate (pKa=4.76), sodium acetate (pKa=4.76) and potassium oxalate (pKa1=1.38, pKa2=4.28) respectively served as absorption agents to prepare a reactive solution. $CO_2$ gas was then introduced into the reactive solution. The reaction was allowed to proceed for 80 min under 1 atm and 29° C. The obtained product was analyzed by TGA-FTIR at the absorption peak of 2400 cm-1 to determine whether $CO_2$ was captured therein.

Result:

The properties of the reactive solution used in each of E1-E9 and C1-03, and the absorbed and/or desorbed $CO_2$ amount per mole of the absorption agent as determined in each of E1-E9 and C1-03 are summarized in Table 1.

TABLE 1

| | | Reactive solution | | | Product | | Desorbed $CO_2$(mole) |
|---|---|---|---|---|---|---|---|
| | Absorption agent | pH | Molality (m) | pH | Absorbed $CO_2$(mole) per mol of absorption agent | | per mol of absorption agent |
| E1 | Potassium | 10.41 | 20 | 7.55 | 0.273 | | 0.25 |
| E2 | acetate | 10.03 | 15 | 7.58 | 0.142 | | 0.13 |
| E3 | | 9.53 | 10 | 7.45 | 0.089 | | trace |
| E4 | | 9.06 | 5 | 7.09 | $5 \times 10^{-3}$ | | trace |
| E5 | Potassium propionate | 9.06 | 16 | 7.59 | 0.23 | | 0.19 |
| E6 | Potassium butyrate | 9.93 | 16 | 7.58 | 0.326 | | 0.3 |
| E7 | DiPotassium phosphate | 15.2 | 8 | 9.06 | 0.35 | | 0.2 |
| E8 | Potassium acetate | 10.43 | 20 | 7.55 | 0.273 | | — |
| E9 | Tetra-potassium EDTA | 10.16 | 2.65 | 8.09 | 0.25 | | — |

TABLE 1-continued

| | Reactive solution | | | Product | Desorbed CO$_2$(mole) |
|---|---|---|---|---|---|
| | Absorption agent | pH | Molality (m) | pH | Absorbed CO$_2$(mole) per mol of absorption agent | per mol of absorption agent |
| C1 | Calcium acetate | 6.6 | 2.5 | 6.6 | 0 | — |
| C2 | Sodium acetate | 7.28 | 14 | 7.1 | 0 | — |
| C3 | Potassium oxalate | 9.7 | 2.1 | 7.3 | 0 | — |

—: No collection of desorbed CO2

It can be seen from Table 1 that CO2 was effectively absorbed by virtue of E1-E9, but CE1-CE3 led to no absorption. In addition, regarding E1-E9, the absorbed CO2 could be effectively desorbed through heating or water addition. The desorbed CO2 may be further recycled and reused. The results indicate that potassium phosphate, potassium potassium EDTA (such as tetrapotassium EDTA) and the potassium monocarboxylate having a total number of 12 or less carbon atoms (such as potassium acetate, potassium propionate and potassium butyrate) are effective in capturing CO2, thereby rendering the method of the disclosure satisfactory.

Besides, monoethanolamine (MEA, purchased from Shin Shin Chemical Co., Ltd.), a well-known CO2 absorption agent, was used in a positive control method (PC) to be compared with potassium butyrate used in the experimental method E6-1. In each of PC and E6-1, the reactive solution was aerated and reacted with CO2 for 15 min under 1 atm and 29° C. The product which contained CO2 captured by the absorption agent was analyzed by TGA-FTIR. The rate of CO2 capture (mol/min) was calculated by dividing the total amount of absorbed CO2 in the product by a time of 15 minutes. The results are shown in the following Table 2.

TABLE 2

| | Reactive solution | | Product |
|---|---|---|---|
| | Absorption agent | Concentration | Rate of CO$_2$ capture (mol/min) |
| E6-1 | Potassium butyrate | 16 m | 14.23 |
| PC | MEA | 99 wt % | 11.36 |

The results in Table 2 show that, as compared with MEA, potassium butyrate used in the method of the disclosure exhibits a higher rate of CO2 capture.

Example 2

<Experimental Methods 10-17 (E10-17)>

To determine whether nitrogen oxides (NOx) and sulfur oxides (SOx) could be separated from a CO2-containing source by the method of the disclosure and whether the same would inhibit the effect of CO2 capture, the experimental methods E10-17 were conducted in a manner similar to that of E1. The differences resided in that various concentrations of sulfuric acid or nitric acid were respectively added into reactive solutions so as to mimic the dissolution of nitrogen oxides and sulfur oxides in aqueous solutions, and the steps of desorbing CO2 and collecting the desorbed CO2 were omitted. The time for capturing CO2 and the absorbed CO2 amount per mole of the absorption agent in each of E10-17 are shown in Table 3.

TABLE 3

| | Sulfuric acid (ppm) | Nitric acid (ppm) | CO$_2$ capturing time (min) | Absorbed CO$_2$ (mole) per mole of absorption agent |
|---|---|---|---|---|
| E10 | 500 | 0 | 100 | 0.1968 |
| E11 | 1000 | 0 | 110 | 0.2082 |
| E12 | 2500 | 0 | 160 | 0.1978 |
| E13 | 5000 | 0 | 105 | 0.1856 |
| E14 | 0 | 500 | 221 | 0.2049 |
| E15 | 0 | 1000 | 240 | 0.1837 |
| E16 | 0 | 2500 | 95 | 0.1958 |
| E17 | 0 | 5000 | 125 | 0.1725 |

It can be seen from Table 3 that the absorption of CO2 is not significantly affected by the presence of sulfuric acid and nitric acid in the reactive solution. It is also found that each of sulfuric acid and nitric acid was reacted with the potassium ions in the reactive solution to form a precipitate (i.e. potassium sulfate or potassium nitrate), indicating that sulfuric acid and nitric acid can be separated from a CO2-containing source by the method of this disclosure without significantly affecting the absorbing rate of CO2.

In view of the foregoing, by virtue of a specific absorption agent dissolvable in a reactive solution, carbon dioxide can be effectively and efficiently absorbed and then separated from a carbon dioxide-containing source. Moreover, the absorbed CO2 can be desorbed by heating or water addition for further recycling. It also reveals that nitrogen oxides and sulfur oxides will not affect the absorbing rate of CO2 and may be separated from a carbon dioxide-containing source by the method of this disclosure.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," and so forth means that a particular feature, structure, or characteristic may be included in the practice of the disclosure. It should be further appreciated that in the description, various features are sometimes grouped together in a single embodiment or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method of capturing carbon dioxide from a source thereof, comprising:
   contacting a carbon dioxide-containing source with a reactive solution that consists of water and an absorption agent dissolved in water so that carbon dioxide in the carbon dioxide-containing source is absorbed by the absorption agent, the absorption agent being a potassium non-amino-acid monocarboxylate having a total of 12 or less carbon atoms.

2. The method of claim 1, wherein the absorption agent is selected from the group consisting of potassium acetate, potassium propionate, potassium butyrate, and combinations thereof.

3. The method of claim 1, wherein the molality of the absorption agent in the reactive solution ranges from 2 m to 20 m.

4. The method of claim 1, further comprising desorbing the absorbed carbon dioxide.

5. The method of claim 4, further comprising collecting the desorbed carbon dioxide.

6. The method of claim 4, wherein the absorbed carbon dioxide is desorbed by heating the reactive solution that contains the carbon dioxide absorbed by the absorption agent.

7. The method of claim 6, wherein the heating is performed at a temperature ranging from 70° C. to 100° C.

8. The method of claim 4, wherein the absorbed carbon dioxide is desorbed by addition of water into the reactive solution that contains the carbon dioxide absorbed by the absorption agent.

9. The method of claim 8, wherein the amount of water added into the reactive solution to desorb the absorbed carbon dioxide is 30% to 50% of the weight of the reactive solution.

* * * * *